US012747616B2

(12) United States Patent
Kim et al.

(10) Patent No.: US 12,747,616 B2
(45) Date of Patent: Sep. 29, 2026

(54) DOOR LATCH DEVICE FOR VEHICLES

(71) Applicants: Hyundai Motor Company, Seoul (KR); Kia Corporation, Seoul (KR); PHA CO., LTD., Daegu (KR)

(72) Inventors: Hyong Don Kim, Hwaseong-Si (KR); Yongdae Seo, Hwaseong-Si (KR); Jong Chul Oh, Daegu (KR); Tae Won Kim, Daegu (KR); Do Sik Moon, Daegu (KR); Hyeon Yeong Park, Daegu (KR); Kyung Yul Kim, Daegu (KR); Hyun Duk Cho, Daegu (KR); Jong Ho Park, Daegu (KR)

(73) Assignees: Hyundai Motor Company, Seoul (KR); Kia Corporation, Seoul (KR); PHA CO., LTD., Daegu (KR)

( * ) Notice: Subject to any disclaimer, the term of this patent is extended or adjusted under 35 U.S.C. 154(b) by 14 days.

(21) Appl. No.: 18/933,176

(22) Filed: Oct. 31, 2024

(65) Prior Publication Data

US 2025/0230691 A1 Jul. 17, 2025

(30) Foreign Application Priority Data

Jan. 16, 2024 (KR) ........................ 10-2024-0006588

(51) Int. Cl.
*E05B 83/38* (2014.01)
*E05B 77/00* (2014.01)

(52) U.S. Cl.
CPC .............. *E05B 83/38* (2013.01); *E05B 77/00* (2013.01)

(58) Field of Classification Search
CPC .......... E05B 79/02; E05B 83/36; E05B 83/38; E05B 83/40; E05B 85/00; E05B 85/04;
(Continued)

(56) References Cited

U.S. PATENT DOCUMENTS 6,851,743 B2 * 2/2005 George .................... E05D 15/48 49/260
8,282,156 B1 * 10/2012 Thiele ...................... E05F 5/003 296/207

(Continued)

FOREIGN PATENT DOCUMENTS

CN 107060536 A * 8/2017 ............. E05B 83/18
CN 108930459 A * 12/2018 ............. E05B 79/02

(Continued)

OTHER PUBLICATIONS

Espacenet, machine translation of CN 113846914 A, generated Jan. 10, 2026 (Year: 2026).*

*Primary Examiner* — Kristina R Fulton
*Assistant Examiner* — Emily G. Brown
(74) *Attorney, Agent, or Firm* — MORGAN, LEWIS & BOCKIUS LLP

(57) ABSTRACT

A door latch apparatus for vehicles, includes: a door striker fixed to a vehicle body in response to one lower side of a door which is opened or closed by double motions of pop-up and swing motions through a hinge unit; a latch unit mounted on the one lower side of the door to lock or release the door striker; a pop-up guide unit guiding the one lower side of the door by the door striker during the pop-up motion of the door; a locking unit locking the door striker when the door striker enters the pop-up guide unit while the door is closed by the swing motion; and a door sagging prevention bracket including one end portion fixed to a body of the latch unit, and extending toward the locking unit while being spaced apart from the top portion of the pop-up guide unit.

11 Claims, 13 Drawing Sheets

(58) Field of Classification Search
CPC .. E05B 77/00; B60J 5/04; B60J 5/0479; B60J 5/12; B60J 2005/0475
See application file for complete search history.

(56) References Cited

U.S. PATENT DOCUMENTS

| | | | | |
|---|---|---|---|---|
| 9,617,755 | B2 * | 4/2017 | Peabody | E05B 47/0046 |
| 10,024,084 | B2 * | 7/2018 | Choi | E05B 79/20 |
| 2005/0127712 | A1 * | 6/2005 | Castillo | E05D 3/127 296/146.12 |
| 2008/0100091 | A1 * | 5/2008 | Kunishima | E05D 15/1081 296/146.1 |
| 2010/0018125 | A1 * | 1/2010 | Oh | E05F 15/40 49/449 |
| 2013/0133157 | A1 * | 5/2013 | Kimura | A47B 88/467 16/49 |
| 2016/0348409 | A1 * | 12/2016 | Choi | E05B 83/40 |
| 2021/0301565 | A1 * | 9/2021 | Sasaki | E05B 85/245 |
| 2022/0120117 | A1 * | 4/2022 | Ottino | B60J 5/0479 |
| 2022/0290474 | A1 * | 9/2022 | Fukahori | E05B 79/20 |

FOREIGN PATENT DOCUMENTS

| | | | | |
|---|---|---|---|---|
| CN | 113846914 A | * | 12/2021 | B60J 5/107 |
| DE | 102020203441 A1 | * | 6/2021 | E05D 15/101 |

* cited by examiner

DOOR LATCH DEVICE FOR VEHICLES

CROSS-REFERENCE TO RELATED APPLICATION

The present application claims priority to Korean Patent Application No. 10-2024-0006588 filed on Jan. 16, 2024, the entire contents of which is incorporated herein for all purposes by this reference.

BACKGROUND OF THE PRESENT DISCLOSURE

Field of the Present Disclosure

The present disclosure relates to a door latch device for vehicles, and to a door latch device for vehicles that prevents a door from sagging when the door performs the closing operation by a swing motion in a vehicle without a B pillar.

Description of Related Art

In general, a vehicle door may separate the inside and the outside of a vehicle, block external noise, rain, dust, wind, or the like, and perform an important function of absorbing an impact together with a side structure to thus safely protect a passenger when a side collision occurs.

There are various types of vehicle doors, including special-purpose doors, and hinged swing doors are most often applied to a passenger vehicle.

In general, the swing door refers to a door which is opened outwardly from a vehicle body around a hinge shaft provided through a hinge bracket between the door and the vehicle body. This swing door may be easily opened and closed, and have a simple structure, thus allowing its easy maintenance and repair.

Meanwhile, some vehicles use an opposing swing door which has a large sense of openness when the door is opened and is advantageous for the passenger to enter or exit the vehicle.

The opposing swing door may be classified into a type without a B pillar and a type with a B pillar.

As shown in FIG. 1, an existing opposing swing door applied to a vehicle without a B pillar may include a front door 110 having a hinge shaft installed at a vehicle body 100 and a front end portion of the front door 110, and a rear door 120 having a hinge shaft installed at the vehicle body 100 and a rear end portion of the rear door 120.

In the present opposing swing door, a latch unit LC may be provided on one side of the front door 110 or the rear door 120 to maintain its locking state. As shown in FIG. 3, the rear door 120 may include a door latch device 140 provided on one front lower side thereof. The door latch device 140 may be operated on a striker 150 fixed to one side of the vehicle body to maintain the locking state of the door.

Recently, a structure has been used that allows the rear door to be opened or closed through pop-up, sliding, and swing motions mainly through a hinge unit 130, thus omitting rails at the top portion and bottom portion of the door. In the present structure, a fixing structure such as a latch may be applied to the top portion and bottom portion of the door, and there is no way to prevent the door from sagging until the door fixing structure is fastened during the sliding motion.

As shown in FIG. 2, when the sagging occurs in the rear door 120, a bottom 122 of the rear door 120 may be in contact with a side step cover 128 of the vehicle body (in area ‘B’), and the door may be in contact with a portion where the door latch device 140 and the door striker 150, installed in the rear door 120, are fastened to each other (in area ‘C’), which may cause damage to the door, and cause the door to be reversed because a male-female coupling of the upper stopper is not formed correctly.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door latch device for vehicles that prevents door sagging by further mounting a door sagging prevention bracket on the door latch device to thus support the bottom portion of a door, and prevents damage to the door while ensuring a smooth operation of the door by preventing interference of the bracket with a portion of the door latch device.

According to an exemplary embodiment of the present disclosure, provided is a door latch device for vehicles, the device including: a door striker fixed to a vehicle body in response to one lower side of a door which is opened or closed by double motions of pop-up and swing motions through a hinge unit; a latch unit mounted on the one lower side of the door to lock or release the door striker; a pop-up guide unit guiding the one lower side of the door by the door striker during the pop-up motion of the door; a locking unit locking the door striker when the door striker enters the pop-up guide unit while the door is closed by the swing motion; and a door sagging prevention bracket including one end portion fixed to a body of the latch unit, and extending toward the locking unit while being spaced apart from the top portion of the pop-up guide unit.

The latch unit may lock or release the door striker through a claw lever and a pawl lever, disposed on the body.

The pop-up guide unit may include a guide groove formed by a first guider and a second guider, each formed on one side of the body, and may be moved for the door striker to be inserted into the guide groove.

The locking unit may include a locking claw, a locking claw link, a locking pawl, and a release lever, disposed on the pop-up guide unit, and lock the door striker through the locking claw when the door striker enters the pop-up guide unit while the door is closed by the swing motion.

The door sagging prevention bracket may include a first bracket including a first end portion fixed to an upper surface of the body of the latch unit and protruding in a direction perpendicular to the body and a second end portion extending from the first end portion in a direction parallel to the body; a second bracket extending integrally from the second end portion of the first bracket, and bent to extend while having a height lower than a vertical height of the second end portion of the first bracket; and a third bracket extending integrally from the second bracket and extending toward the top portion of the locking unit while having a height higher than the vertical height of the second bracket.

The vertical height of the second bracket may be a height allowing the bottom portion of the second bracket to be in contact with the top portion of the door striker entering the pop-up guide unit.

A width of the second bracket may be smaller than a width of the top portion of the door striker.

A width of the third bracket may be reduced in a direction in which the third bracket extends toward the locking unit.

A plurality of ribs may be formed on the bottom portion of the second bracket, extend in a direction perpendicular to the top portion of the door striker, which enters the pop-up guide unit, and protrude toward the door striker.

A plastic coating layer may be formed on an upper surface of the door sagging prevention bracket.

According to an exemplary embodiment of the present disclosure, in the vehicle without a B pillar, when the door performs the closing operation by the swing motion, the door sagging in the H direction may be prevented by applying the door latch device further including the door sagging prevention bracket in contact with the door striker.

Furthermore, the door latch device may prevent the door from sagging during the sliding movement section of the door, enable the smooth door operation, and prevent the damage to the door.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
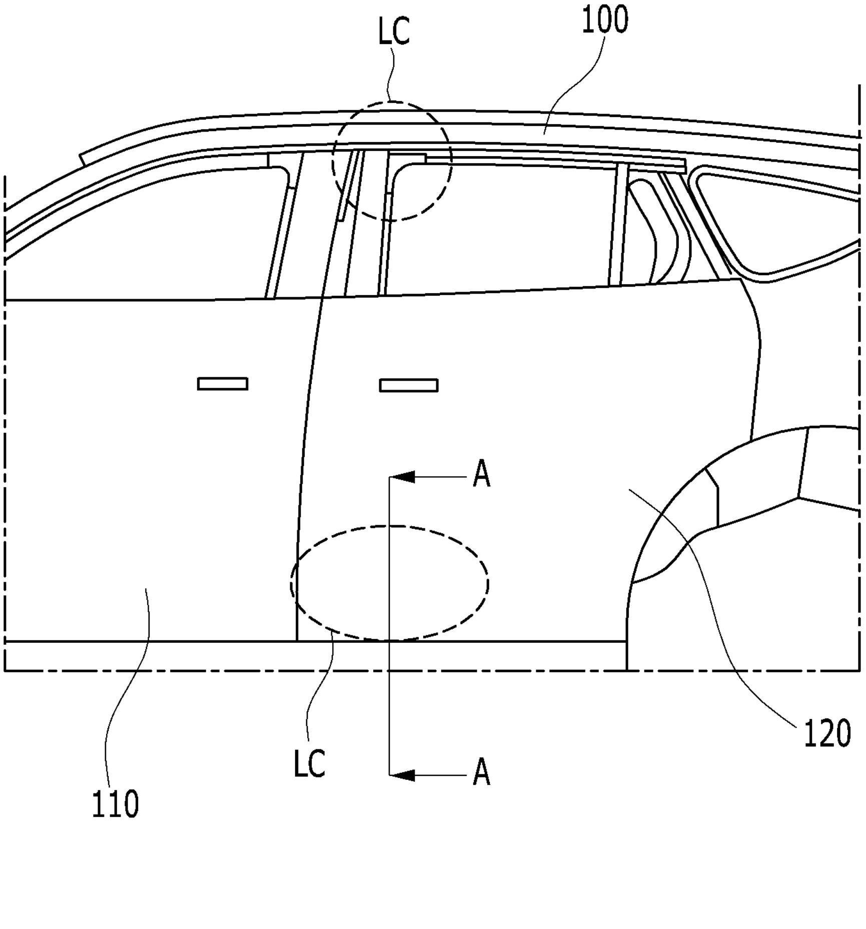
FIG. 1 (Prior Art)
FIG. 1 is a side view showing a vehicle using an opposing swing door according to a conventional example.
Figure 2:
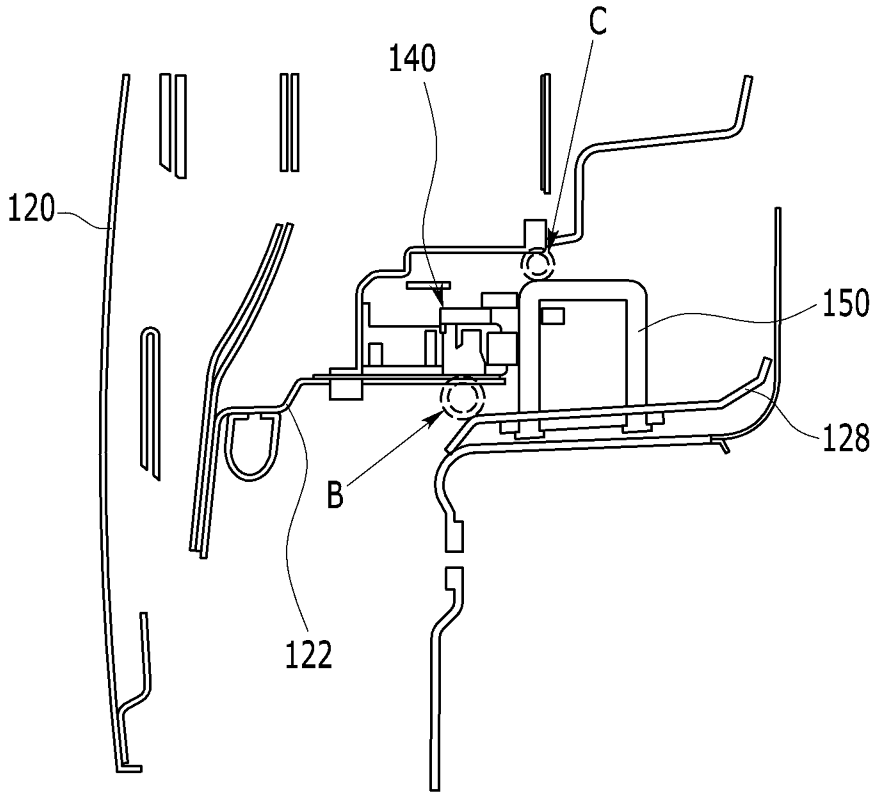
FIG. 2 (Prior Art)
FIG. 2 is a cross-sectional view taken along line 'A-A' in FIG. 1.
Figure 3:
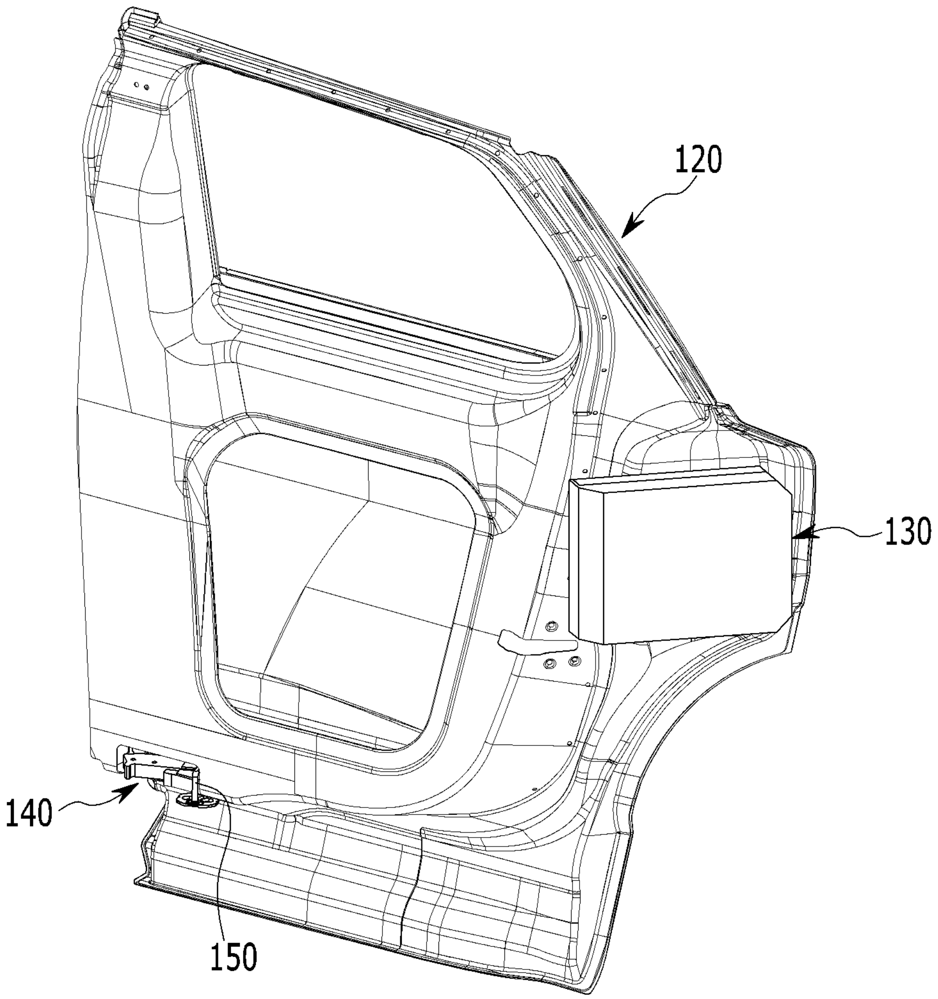
FIG. 3 (Prior Art)
FIG. 3 is a perspective view of a rear door of the opposing swing doors according to the conventional example.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure are described in detail with reference to the accompanying drawings so that those skilled in the art to which the present disclosure pertains may easily practice the present disclosure. The present disclosure may be modified in various different forms, and is not limited to the exemplary embodiments provided in the specification.

Furthermore, in various exemplary embodiments of the present disclosure, components including the same configuration are representatively described using the same reference numerals in an exemplary embodiment of the present disclosure, and only components different from those of an exemplary embodiment are described in the other embodiments.

It should be understood that the drawings are schematic and not drawn to scale. The size and proportion of a component in the drawings are shown relatively exaggerated or reduced in size for clarity and convenience in the drawings. This arbitrary size is only illustrative and not limitative. In addition, the same reference numeral is used to denote a similar feature of the same structure, element, or part shown in two or more drawings. When it is described that an element is referred to as being "on" or "above" another element, it is to be understood that the element may be directly "on" another element or "above" another element having a third element interposed therebetween.

An exemplary embodiment of the present disclosure specifically represents an exemplary embodiment of the present disclosure. As a result, diagrams may be various modified. Accordingly, an exemplary embodiment of the present disclosure is not limited to a specific shape of the illustrated portion, and may include, for example, a shape modified when produced.

Hereinafter, a structure of a door latch device for vehicles according to an exemplary embodiment of the present disclosure is described in detail with reference to the accompanying drawings. In describing the exemplary embodiments of the present disclosure, for convenience of explanation, the description is provided by defining an upper left side of FIG. 6 as the front and the lower right side of FIG. 6 as the rear. Furthermore, the door latch device for vehicles according to an exemplary embodiment of the present disclosure may be provided on both rear doors behind the driver seat and passenger seat of the vehicle, and an exemplary embodiment of the present disclosure describes an example where the door latch device is applied to the rear door behind the passenger seat.

Figure 4:
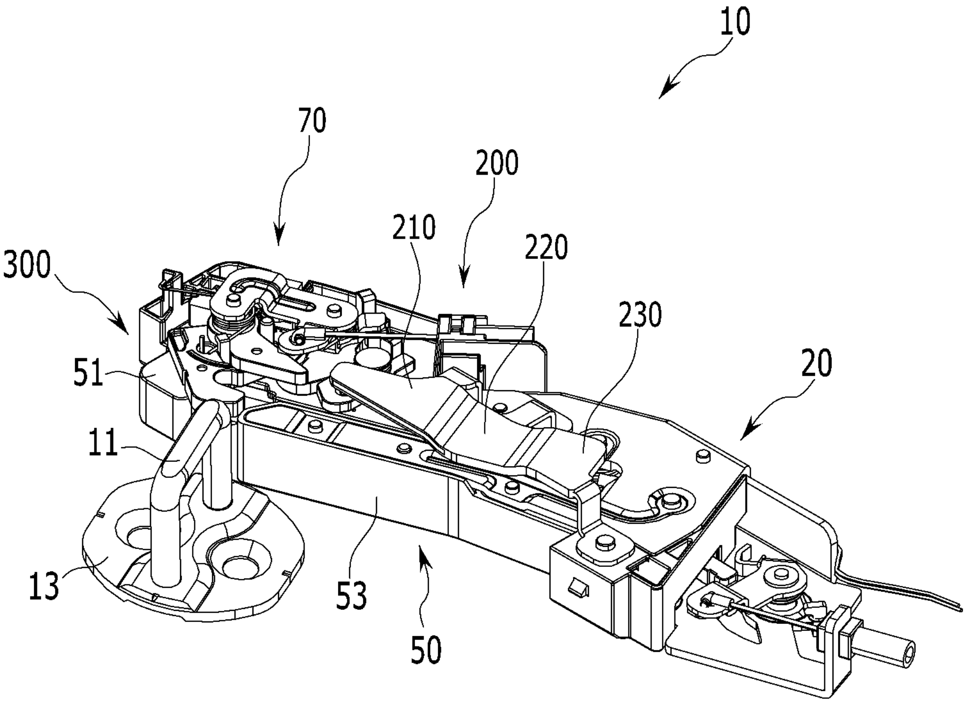
FIG. 4 is a perspective view of a door latch device for vehicles when a swing motion of the door is completed according to an exemplary embodiment of the present disclosure.
Figure 5:
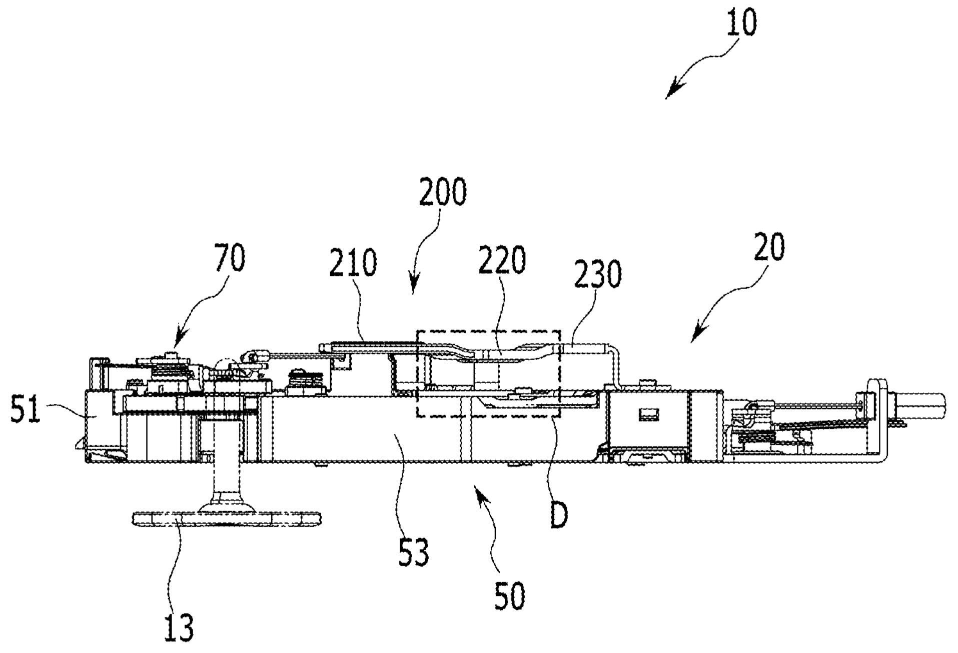
FIG. 5 is a side view of the door latch device for vehicles when the swing motion of the door is completed according to an exemplary embodiment of the present disclosure.

FIG. 4 is a perspective view of the door latch device for vehicles when a swing motion of the door is completed according to an exemplary embodiment of the present disclosure; and FIG. 5 is a side view of the door latch device for vehicles when the swing motion of the door is completed according to an exemplary embodiment of the present disclosure.

The door latch device for vehicles according to an exemplary embodiment of the present disclosure may be applied to a rear door of a passenger vehicle without a B pillar. That is, the door latch device may be disposed between one lower front side of the rear door, which is opened or closed through double motions of pop-up and swing motions through a hinge unit, and a vehicle body corresponding thereto.

Referring to FIG. 4 and FIG. 5, a door latch device 10 for vehicles according to an exemplary embodiment of the present disclosure may include a door striker 11, a latch unit 20, a pop-up guide unit 50, a locking unit 70, and a door sagging prevention bracket 200.

The door striker 11 may be fixed to the vehicle body through a fixing bracket 13 in response to one lower front side of the rear door which is opened or closed by the double motions of the pop-up and swing motions through the hinge unit.

The latch unit 20 may be disposed on one lower front side of the rear door and are configured to lock or release the door striker 11 to thus maintain the rear door closed or open the rear door.

The latch unit 20 may include a body, a claw lever and a pawl lever, disposed on the body, and an operation lever.

The latch unit 20 may form a cutout in one lower front side of an internal panel of the rear door, and be provided therein to act on the door striker 11 on the vehicle body.

The pop-up guide unit 50 may guide one lower side of the door by the door striker 11 during a pop-up motion of the door.

The pop-up guide unit 50 may include a first guider 51 integrated with one front side of a body, and a second guider 53 integrated with the other front side of the body while including a guide groove 300 spaced apart from the first guider 51 by a predetermined distance.

The guide groove may facilitate entry of the door striker 11 by including an entrance between the first and second guiders 51 and 53 whose distance is greater than the predetermined distance of the guide groove 300.

Here, the first guider 51 may be longer than the second guider 53 for the entrance where the door striker 11 enters to be directed to the outside of the vehicle body.

The locking unit 70 may lock the door striker 11 when the door striker 11 enters the pop-up guide unit while the door is closed by the swing motion. The locking unit 70 may prevent the rear door from rebounding from the door striker 11 even when a larger force than necessary is applied to the door while the rear door performs a closing operation by the swing motion.

The locking unit 70 may include a locking claw, a locking claw link, a locking pawl, and a release lever. A locking claw may prevent the rear door from leaving in a rebound direction by locking the door striker 11 when the door striker 11 enters the pop-up guide unit 50 while the rear door performs the closing operation by the swing motion.

The door sagging prevention bracket 200 may have one end portion fixed to the body of the latch unit 20, and extend toward the locking unit 70 while being spaced apart from the top portion of the pop-up guide unit 50.

The door sagging prevention bracket 200 may include three portions of a first bracket 230, a second bracket 220, and a third bracket 210.

The first bracket 230 may have one end portion fixed to an upper surface of the body of the latch unit 20 and protruding in a direction perpendicular to the body. The other end portion of the first bracket 230 may be bent from an end portion thereof and extend in a direction parallel to the body.

The second bracket 220 may extend integrally from the other end portion of the first bracket 230, and may be bent to extend while having a height lower than a vertical height of the other end portion of the first bracket 230.

The third bracket 210 may extend integrally from the second bracket 220, and extend toward the top portion of the locking unit 70 while having a height higher than the vertical height of the second bracket 220.

When the door striker 11 is disposed in area 'D' of FIG. 5, the top portion of the door striker 11 may be in contact with the bottom portion of the second bracket 220 of the door sagging prevention bracket 200, preventing the door latch device 10 and the door from sagging downward.

To the present end, the vertical height of the second bracket 220 may have a height allowing the bottom portion of the second bracket 220 to be in contact with the top portion of the door striker 11 entering the pop-up guide unit 50.

Meanwhile, a width of the second bracket 220 may be smaller than a width of the top portion of the door striker 11, and a width of the third bracket 210 may be reduced in a direction in which the third bracket 210 extends toward the locking unit 70.

Figure 6:
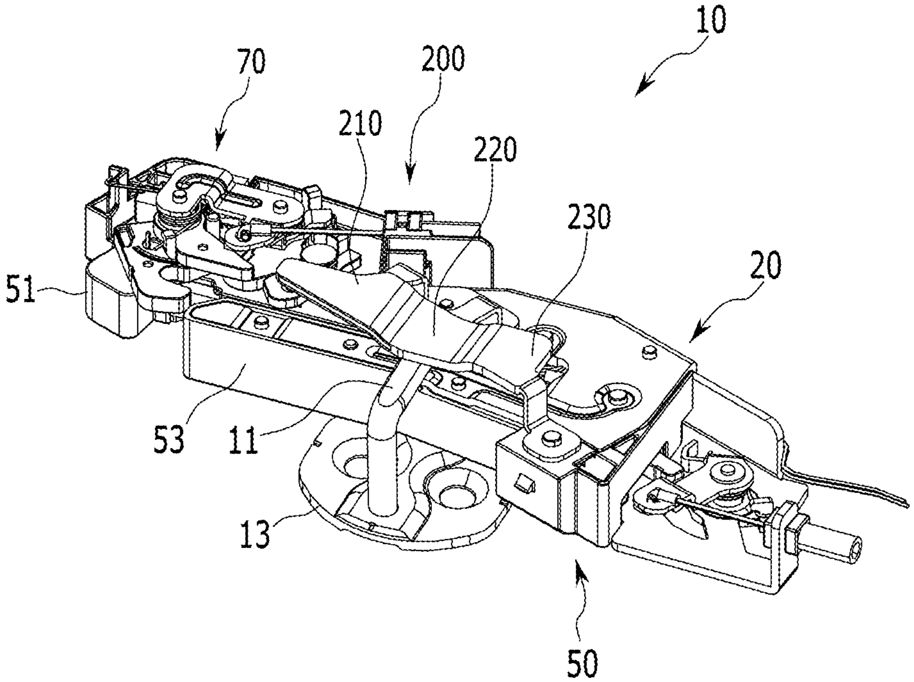
FIG. 6 is a perspective view of the door latch device for vehicles during a sliding motion of the door according to an exemplary embodiment of the present disclosure.
Figure 7:
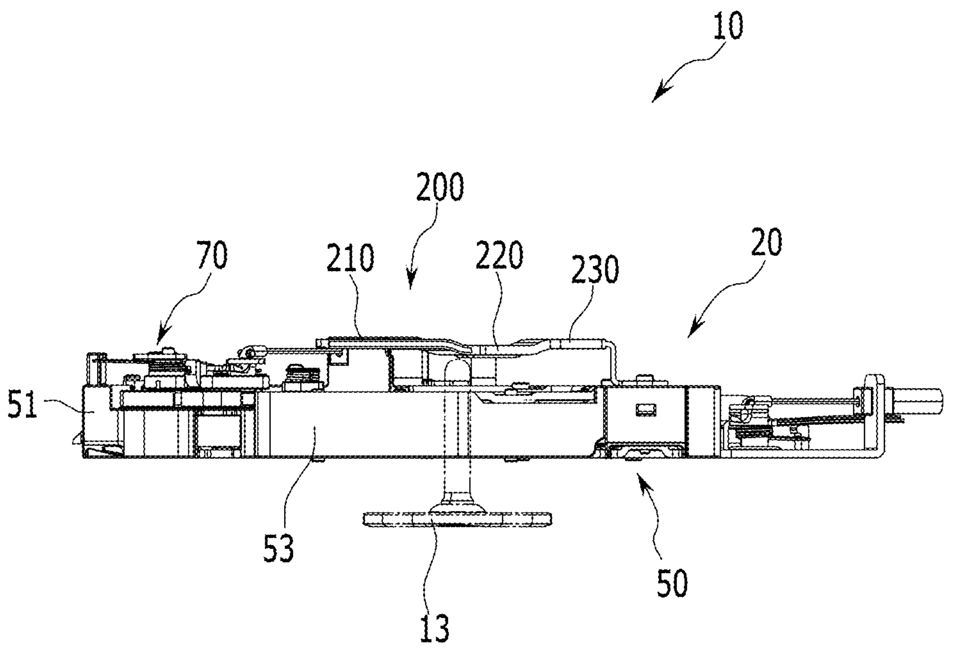
FIG. 7 is a side view of the door latch device for vehicles during the sliding motion of the door according to an exemplary embodiment of the present disclosure.

FIG. 6 is a perspective view of the door latch device for vehicles during the sliding motion of the door according to an exemplary embodiment of the present disclosure; and FIG. 7 is a side view of the door latch device for vehicles during the sliding motion of the door according to an exemplary embodiment of the present disclosure.

Referring to FIG. 6 and FIG. 7, when the rear door starts the sliding motion, the door striker 11 may enter the entrance of the guide groove 300, the door striker 11 may slide along the guide groove 300 to thus push one side of the release lever rearward to thus rotate the release lever, and a lever end portion may thus push the locking pawl to thus rotate the locking pawl.

In the instant case, the top portion of the door striker 11 may be in contact with the bottom portion of the second bracket 220 of the door sagging prevention bracket 200, and the door latch device 10 and the door may thus be prevented from sagging downward by a support force of the door sagging prevention bracket 200.

Figure 8:
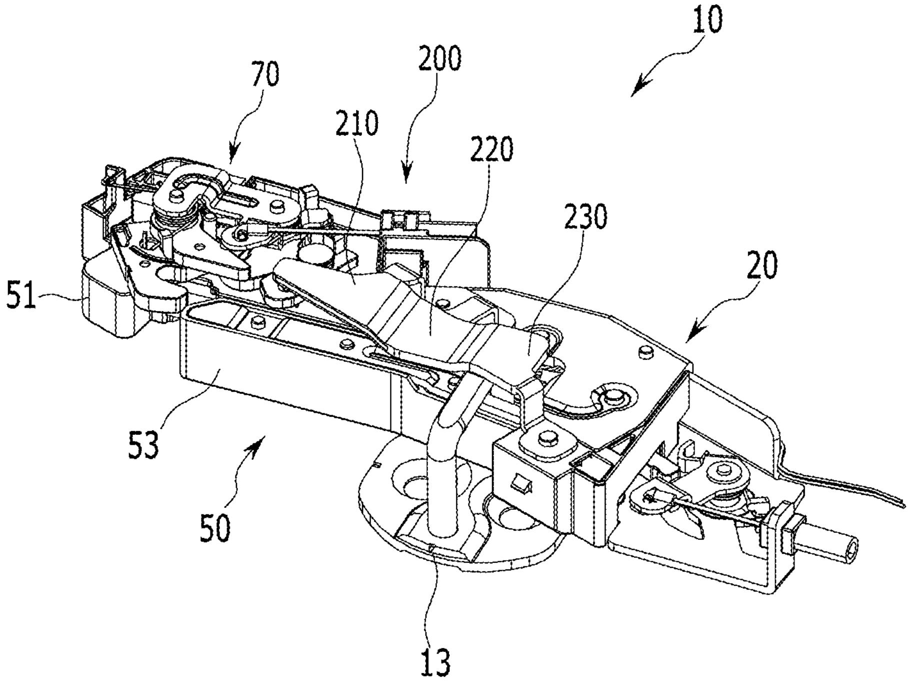
FIG. 8 is a perspective view of the door latch device for vehicles just before fastening of an upper stopper during the sliding motion of the door according to an exemplary embodiment of the present disclosure.
Figure 9:
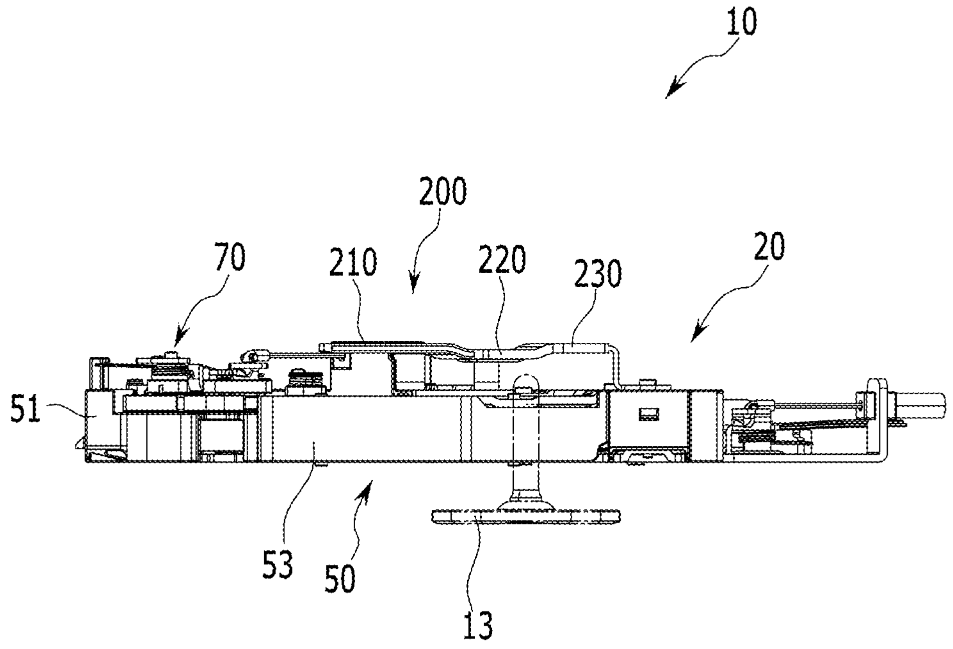
FIG. 9 is a side view of the door latch device for vehicles just before fastening the upper stopper during the sliding motion of the door according to an exemplary embodiment of the present disclosure.

FIG. 8 is a perspective view of the door latch device for vehicles just before fastening of an upper stopper during the sliding motion of the door according to an exemplary embodiment of the present disclosure; and FIG. 9 is a side view of the door latch device for vehicles just before fastening the upper stopper during the sliding motion of the door according to an exemplary embodiment of the present disclosure.

In the instant case, the top portion of the door striker 11 may pass by the second bracket of the door sagging prevention bracket and be disposed below the first bracket 230. A vertical height of the first bracket 230 may be higher than a height of the top portion of the door striker 11, thus preventing the first bracket 230 and the door striker 11 from being in contact with each other. A section where the door striker 11 is disposed at the bottom portion of the first bracket 230 may be a section where the upper stopper is connected.

An overall length of the door sagging prevention bracket 200 may be adjusted based on a length of the door latch device 10, and a contact section of the door sagging prevention bracket 200, that is, a length of the second bracket 220, may also be adjusted as needed.

Figure 10:
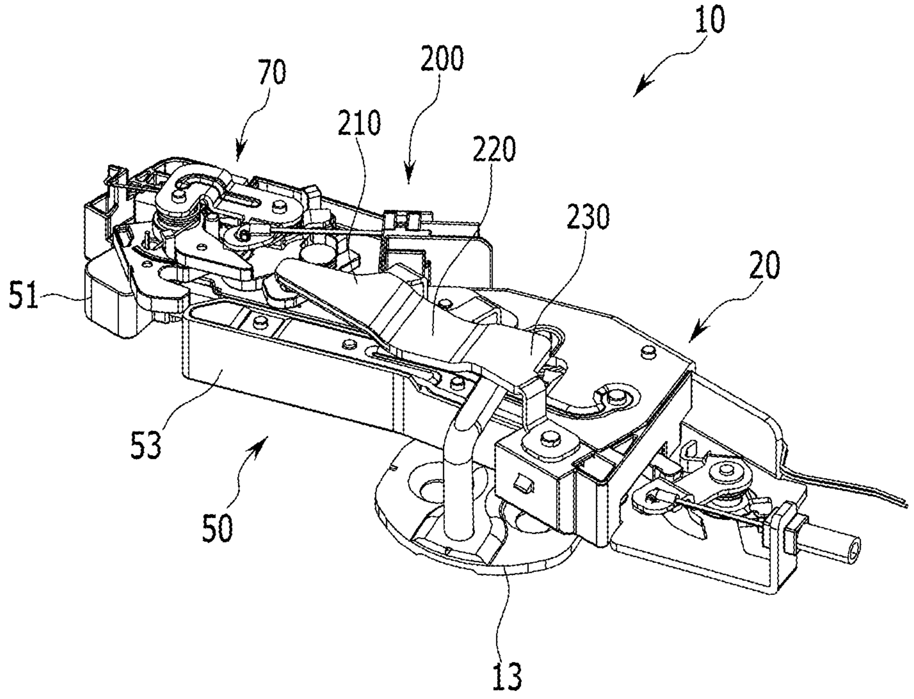
FIG. 10 is a perspective view of the door latch device for vehicles after the sliding motion of the door is completed according to an exemplary embodiment of the present disclosure.
Figure 11:
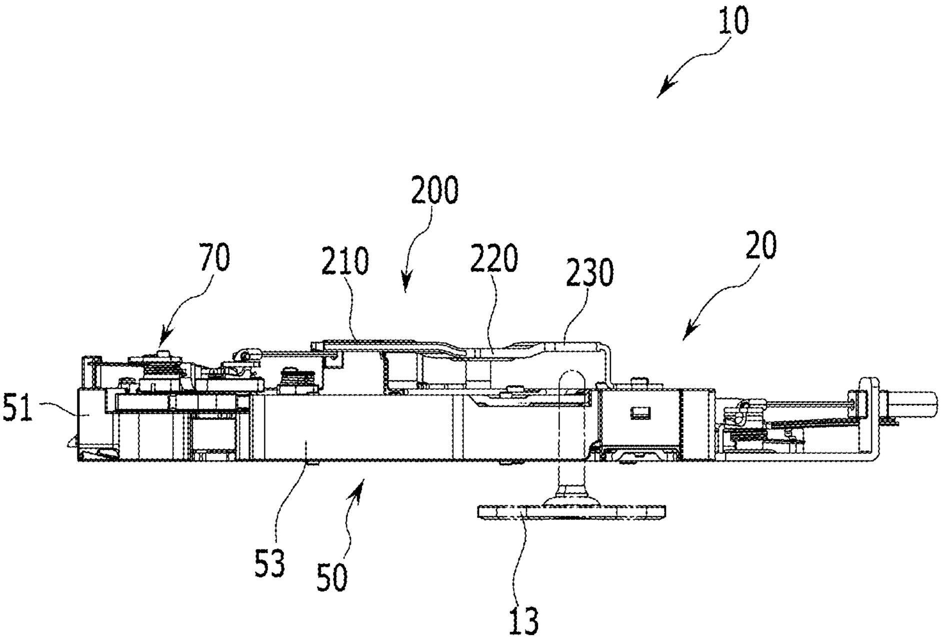
FIG. 11 is a side view of the door latch device for vehicles after the sliding motion of the door is completed according to an exemplary embodiment of the present disclosure.

FIG. 10 is a perspective view of the door latch device for vehicles after the sliding motion of the door is completed according to an exemplary embodiment of the present disclosure; and FIG. 11 is a side view of the door latch device for vehicles after the sliding motion of the door is completed according to an exemplary embodiment of the present disclosure.

In the instant case, after the rear door completes the sliding motion, the door striker 11 may be locked to a locking groove of the claw lever of the latch unit 20. As the door striker 11 completely passes by the release lever, the locking pawl and the release lever may respectively be restored to their initial positions by a locking pawl spring and a lever spring. As a result, the rear door may complete the closing operation by the swing and sliding motions.

Figure 12:
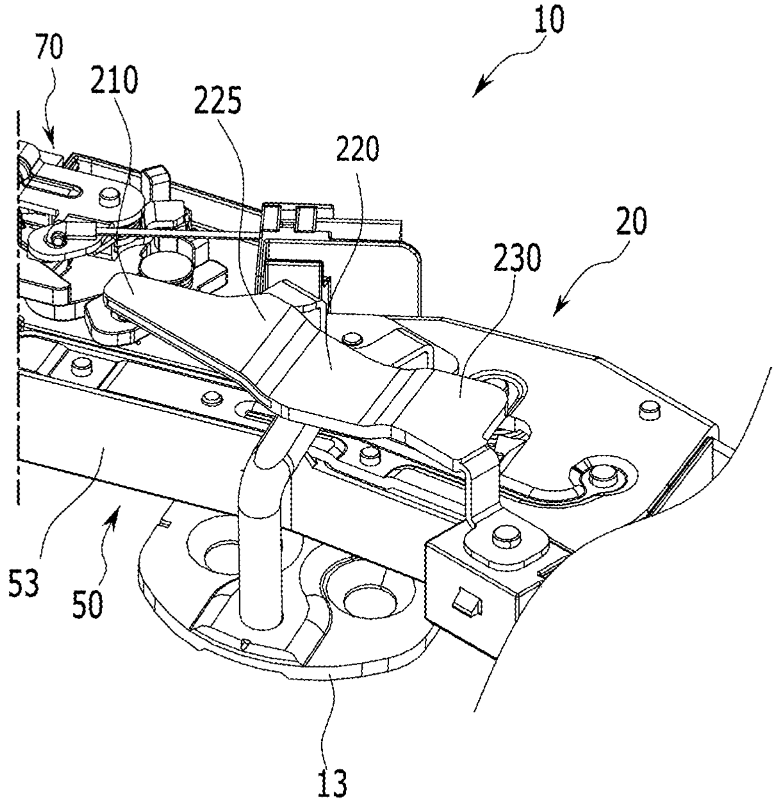
FIG. 12 is an enlarged perspective view of a door sagging prevention bracket portion of the door latch device for vehicles according to an exemplary embodiment of the present disclosure.
Figure 13:
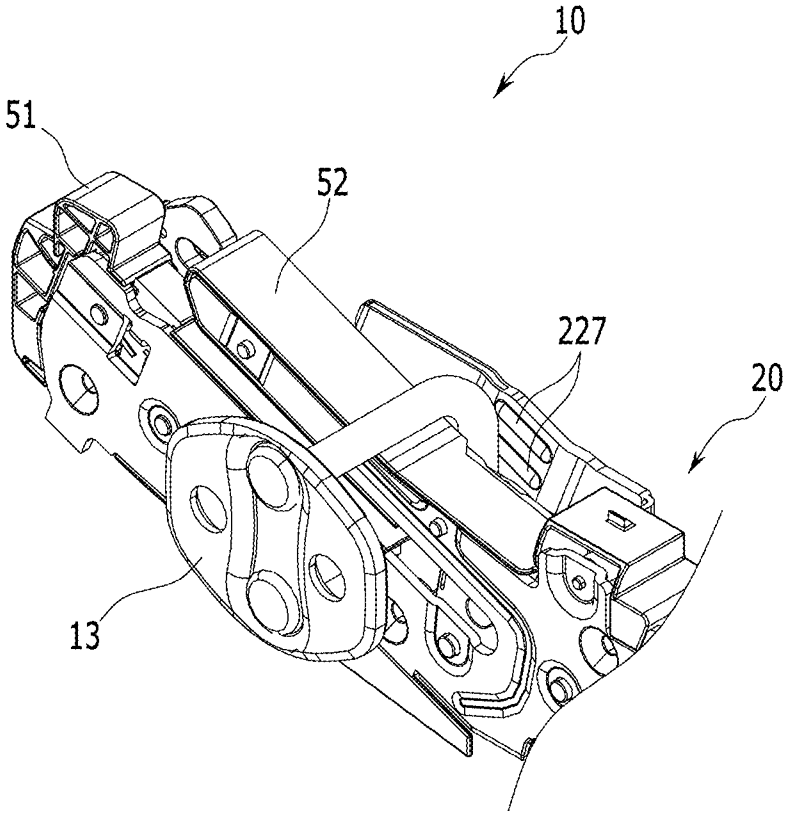
FIG. 13 is a perspective view showing the door sagging prevention bracket portion of the door latch device for vehicles according to an exemplary embodiment of the present disclosure as viewed from below.

FIG. 12 is an enlarged perspective view of a door sagging prevention bracket portion of the door latch device for vehicles according to an exemplary embodiment of the present disclosure; and FIG. 13 is a perspective view showing the door sagging prevention bracket portion of the door latch device for vehicles according to an exemplary embodiment of the present disclosure as viewed from below.

Referring to FIG. 12, an upper surface of the door sagging prevention bracket 200 may include a plastic coating layer 225. A plastic coating may be applied to the corresponding surface to prevent noise caused by friction occurring between the door striker 11 and the door sagging prevention bracket 200.

An exterior of the door latch device 10 may be wrapped by a case. When the door sagging prevention bracket 200 is moved up and down as the door striker 11 and the door sagging prevention bracket 200 are in contact with each other, friction noise may occur as an internal surface of the case comes into contact with the door sagging prevention bracket 200. Therefore, to prevent the present noise, the plastic coating layer 225 made of a soft material may be formed on the upper surface of the door sagging prevention bracket 200.

Referring to FIG. 13, a plurality of ribs 227 may be formed on the bottom portion of the second bracket 220 of the door sagging prevention bracket 200, and protrude toward the door striker 11. The plurality of ribs 227 may extend in a progress direction of the door striker 11. That is, the plurality of ribs 227 may extend in a direction perpendicular to the top portion of the door striker 11, which enters the pop-up guide unit 50. End portions of the plurality of ribs 227 may each be rounded.

The plurality of ribs 227 may minimize the friction occurring when the bottom portion of the second bracket 220 of the door sagging prevention bracket 200 is in contact with the top portion of the door striker 11.

As set forth above, according to an exemplary embodiment of the present disclosure, in the vehicle without a B pillar, when the door performs the closing operation by the swing motion, the door sagging in the H direction may be prevented by applying the door latch device further including the door sagging prevention bracket in contact with the door striker.

Furthermore, the door latch device may prevent the door from sagging during the sliding movement section of the door, enable the smooth door operation, and prevent the damage to the door.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the present specification, unless stated otherwise, a singular expression includes a plural expression unless the context clearly indicates otherwise.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door latch apparatus for vehicles, the apparatus comprising:

a door striker fixed to a vehicle body at a position corresponding to one lower side of a door which is opened or closed by double motions of pop-up and swing motions through a hinge unit;

a latch unit mounted on the one lower side of the door to lock or release the door striker;

a pop-up guide unit guiding the one lower side of the door by the door striker during the pop-up motion of the door;

a locking unit locking the door striker in response to the door striker entering the pop-up guide unit while the door is closed by the swing motion; and a door sagging prevention bracket including one end portion fixed to a body of the latch unit, and extending toward the locking unit while being spaced apart from a top portion of the pop-up guide unit, wherein the pop-up guide unit includes a guide groove formed by a first guider and a second guider, each formed on one side of the body, and is moved for the door striker to be inserted into the guide groove.

2. The apparatus of claim 1, wherein the latch unit locks or releases the door striker through a claw lever and a pawl lever, disposed on the body.

3. The apparatus of claim 1, wherein the locking unit includes a locking claw, a locking claw link, a locking pawl, and a release lever, disposed on the pop-up guide unit, and locks the door striker through the locking claw in response to the door striker entering the pop-up guide unit while the door is closed by the swing motion.

4. The apparatus of claim 1, wherein the door sagging prevention bracket includes:

a first bracket portion including a first end portion fixed to an upper surface of the body of the latch unit and protruding in a direction perpendicular to the body and a second end portion extending from the first end portion in a direction parallel to the body;

a second bracket portion extending integrally from the second end portion of the first bracket portion, and bent to extend while having a vertical height lower than a vertical height of the second end portion of the first bracket portion; and a third bracket portion extending integrally from the second bracket portion and extending toward a top portion of the locking unit while having a height higher than the vertical height of the second bracket portion.

5. The apparatus of claim 4, wherein the vertical height of the second bracket portion is a height allowing a bottom portion of the second bracket portion to be in contact with a portion of the door striker entering the pop-up guide unit.

6. The apparatus of claim 5, wherein a width of the second bracket portion is smaller than a width of a top portion of the door striker.

7. The apparatus of claim 6, wherein a width of the third bracket portion is reduced in a direction in which the third bracket portion extends toward the locking unit.

8. The apparatus of claim 5, wherein at least a rib is formed on the bottom portion of the second bracket portion, extend in a direction perpendicular to a top portion of the door striker, which enters the pop-up guide unit, and protrude toward the door striker.

9. The apparatus of claim 4, wherein the vertical height of the first bracket portion is higher than a vertical height of a top portion of the door striker, thus preventing the first bracket portion and the door striker from being in contact with each other.

10. The apparatus of claim 4, wherein a plastic coating layer is formed on an upper surface of the door sagging prevention bracket.

11. The apparatus of claim 10, wherein the plastic coating layer is formed on the upper surface of the door sagging prevention bracket, in which a friction occurs between the door striker and the door sagging prevention bracket.

* * * * *